(12) United States Patent
Pletschet

(10) Patent No.: US 6,311,576 B1
(45) Date of Patent: Nov. 6, 2001

(54) ANTI-BACKLASH NUT FOR LEAD SCREW

(75) Inventor: Timothy J. Pletschet, San Francisco, CA (US)

(73) Assignee: Techmetric Inc., Concord, CA (US)

( * ) Notice: Subject to any disclaimer, the term of this patent is extended or adjusted under 35 U.S.C. 154(b) by 0 days.

(21) Appl. No.: 09/411,875

(22) Filed: Oct. 4, 1999

(51) Int. Cl.[7] .............................. F16H 25/24; F16H 57/12
(52) U.S. Cl. ................................. 74/441; 74/89.42
(58) Field of Search ..................... 74/459, 441, 409, 74/424.8 A, DIG. 10, 89.42

(56) References Cited

U.S. PATENT DOCUMENTS

| | | | |
|---|---|---|---|
| 3,004,445 | * | 10/1961 | Monodon ............................ 74/459 |
| 3,170,337 | * | 2/1965 | Linley, Jr. ............................ 74/441 |
| 3,611,818 | * | 10/1971 | Burns et al. ...................... 74/DIG. 10 |
| 4,041,793 | * | 8/1977 | Repay et al. ..................... 74/424.8 R |
| 4,210,033 | * | 7/1980 | Erikson et al. .................. 74/424.8 R |
| 4,274,294 | * | 6/1981 | Siuryj et al. ........................ 74/89.15 |
| 5,303,606 | * | 4/1994 | Kokinda ................................ 74/441 |
| 5,937,702 | * | 8/1999 | Erikson et al. ........................ 74/459 |

FOREIGN PATENT DOCUMENTS 1-153861-A  *  6/1989  (JP) ........................................ 74/441

* cited by examiner

Primary Examiner—David A. Bucci
Assistant Examiner—William C. Joyce
(74) Attorney, Agent, or Firm—Gray Cary Ware & Freidenrich LLP.

(57) ABSTRACT

An anti-backlash nut includes a body having an axially-extending bore and internal threads for engaging a lead screw inserted into the bore. The internal threads are divided circumferentially into three inner segments each movable in a radial direction. The anti-backlash nut also includes springs for independently biasing the inner segments radially inward to contact the lead screw. The anti-backlash nut provides wear compensation as well as anti-backlash to improve positioning repeatability when used with an open loop positioner.

13 Claims, 2 Drawing Sheets

ANTI-BACKLASH NUT FOR LEAD SCREW

BACKGROUND OF THE INVENTION

1. Field of the Invention

This invention relates to an anti-backlash nut for engaging a lead screw.

2. Description of the Relevant Art

The use of lead screw mechanisms for providing linear motion is well known. A typical lead screw mechanism has a rotating lead screw and a non-rotating traveler that is coupled to the lead screw with a nut. The traveler is typically guided or constrained so that rotation of the lead screw results in linear motion of the traveler.

Fairly high precision positioning can be accomplished with a lead screw mechanism by accurately controlling the rotation of the lead screw. An essential component for precision positioning is an anti-backlash nut or other coupling between the lead screw shaft and the traveler, which reduces or, ideally, eliminates positioning hysteresis resulting from bidirectional rotation of the lead screw.

There are tradeoffs in the design of anti-backlash nuts in that a greater precision (less backlash) may be achieved by reducing the clearance and increasing the contact area and/or forces between the lead screw and the anti-backlash nut, but at the expense of higher frictional forces and wear. It is desirable to have the nut apply a uniform pressure to the lead screw so that there is the same torque load on the lead screw regardless of the direction of travel. It is desirable to have a torsionally stiff nut that avoids or minimizes any wind-up or torsional distortion that could cause positioning inaccuracies. It is desirable to be able to adjust the pressure applied by the nut to optimize it for a particular application. It is also desirable to provide some float or compliance in the nut to avoid binding or high torque, but at the same time not compromising positioning accuracy.

SUMMARY OF THE INVENTION

In accordance with the illustrated preferred embodiment, the present invention is an anti-backlash nut that includes a body having an axially-extending bore and internal threads that engage a lead screw inserted into the bore. The internal threads are divided circumferentially into at least two, and preferably three, inner threaded segments each independently movable in a radial direction. The anti-backlash nut also includes springs that bias the inner threaded segments radially inward to contact the lead screw. The anti-backlash nut provides wear compensation as well as anti-backlash to improve positioning repeatability when used with an open loop positioner.

In a preferred embodiment, the body has an outer shell, and each of the three inner threaded segments is compliantly attached to the outer shell by two axially-extending webs that permit radial movement of the inner threaded segment by bending of the webs. An axially-extending pocket is defined between an outside surface of an inner threaded segment, its two webs, and an inside surface of the outer shell. One of the springs is mounted in each pocket. The springs are preferably fabricated from flat pieces of stainless steel that are bent so that a central portion contacts the outside surface of the inner threaded segment (pushing it radially inward) and two ends contact the inside surface of the shell.

Also preferably, the body and its outer shell, inner threaded segments, and webs are a monolithic structure, composed of a low-friction, self-lubricating material, such as DSM Delrin AF Blend or Turcite. The outer shell preferably further includes a tubular portion spaced axially from the inner threaded segments, where the tubular portion has an inner diameter slightly greater than an outer diameter of the lead screw. The tubular portion has external threads that engage an internally-threaded mounting plate for coupling the nut to a traveler.

The inner threaded segments are independently movable in a radial direction, which provides some degree of radial compliance to avoid binding between the nut and the lead screw. By varying the shape and/or thickness of the springs, the spring force can be varied to adjust the contact force between the inner threaded segments and the lead screw. The radial compliance provides wear compensation and accommodates lateral run-out of the lead screw.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

The drawings and the description herein depict various preferred embodiments of the present invention for purposes of illustration only. One skilled in the art will readily recognize from the following discussion that alternative embodiments of the structures and methods illustrated herein may be employed without departing from the principles of the invention described herein.

Figure 4:
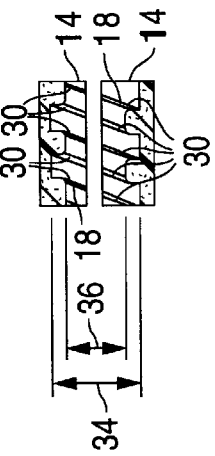
FIG. 4 is a side sectional view of inner threaded segments of the anti-backlash nut.
Figure 5:
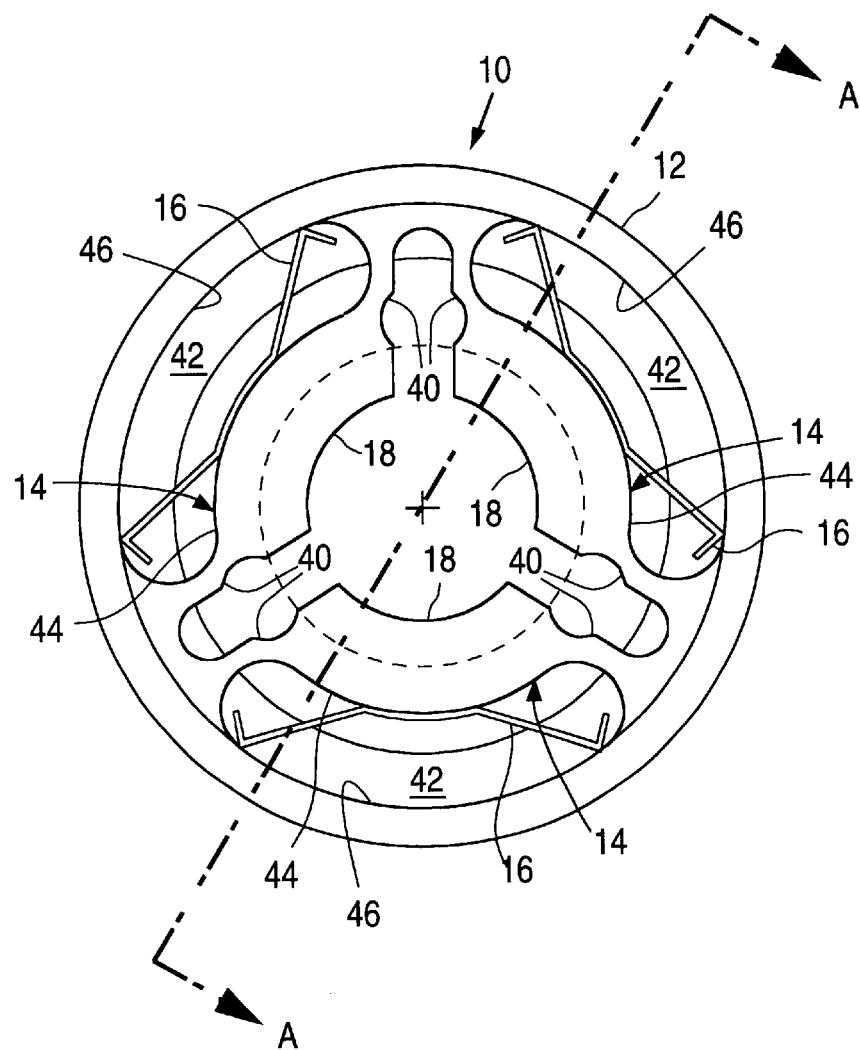
FIG. 5 is an end view of the anti-backlash nut, and illustrates section line A—A for the sectional views of FIGS. 1, 2, and 4.
Figure 6:
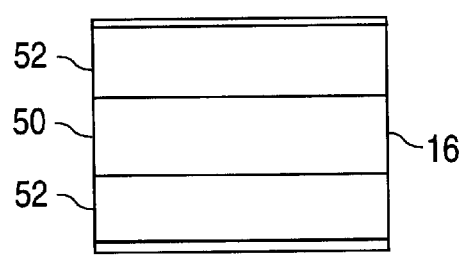
FIG. 6 is a side view of a spring used in the anti-backlash nut.

As shown in FIGS. 1–6, a preferred embodiment of the present invention is an anti-backlash nut 10 that includes a shell 12, three inner threaded segments 14, and three springs 16 (FIGS. 5–6). The inner threaded segments 14 have internal threads 18 that engage a lead screw 20. The nut 10 has an internal bore that extends axially.

Figure 1:
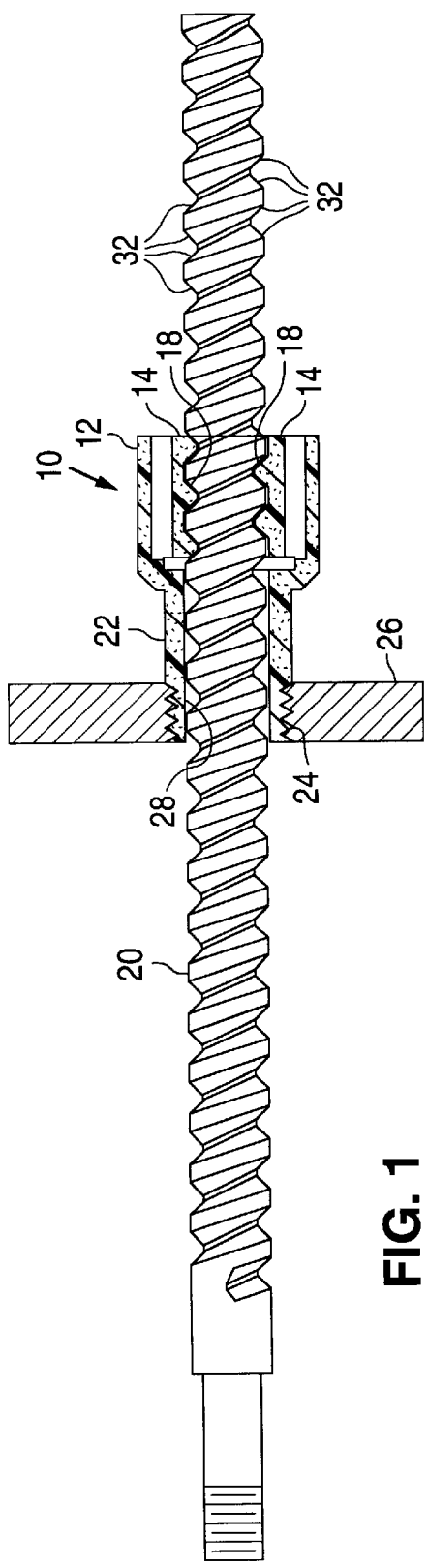
FIG. 1 is a side sectional view of an anti-backlash nut according to the present invention as installed on a lead screw.
Figure 3:
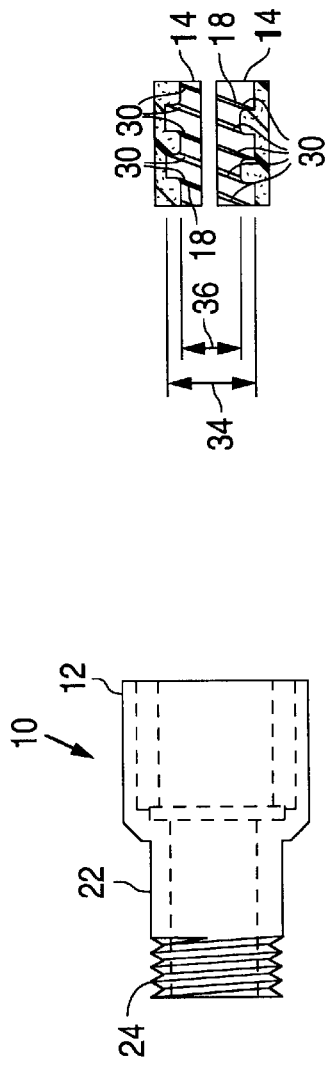
FIG. 3 is a side view of the anti-backlash nut.
Figure 2:
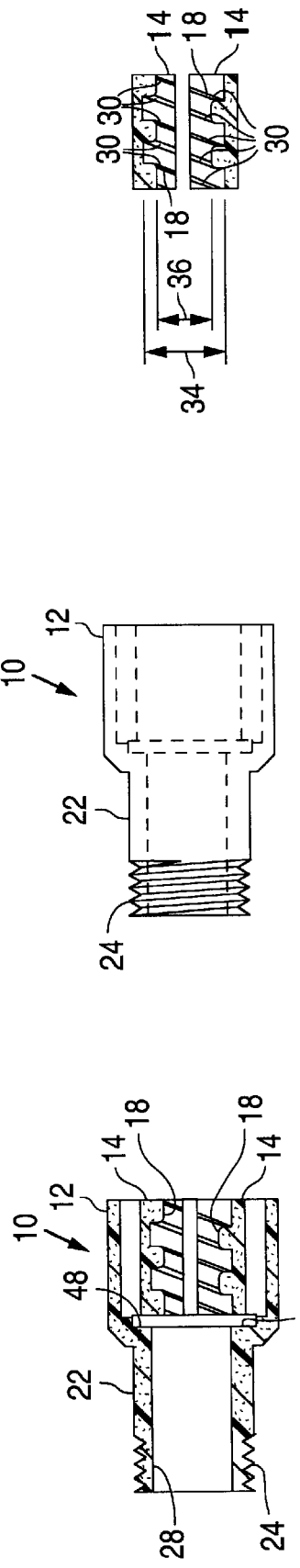
FIG. 2 is a side sectional view of the anti-backlash nut.

As shown in FIGS. 1–3, the shell extends axially to the left of the segments 14, as viewed in those figures, forming a tubular portion 22. The inner diameter 28 of the tubular portion 22 is slightly greater than the outer diameter of the lead screw 20 to provide clearance between the nut 10 and the lead screw. The left end of the nut 10, opposite the segments 14, has an external thread 24. The external thread 24 of the nut 10 engages an internal thread of a mounting plate 26 (FIG. 1) to provide a means for mounting the nut to a traveler (not shown) to be driven by rotation of the lead screw 20. When the lead screw 20 rotates, the nut 10 and attached traveler translates axially.

As shown in FIGS. 1 and 4, the inner threaded segments 14 have thread profiles 18 that match that of the lead screw 20. Angled portions 30 of the inner threaded segments 14 contact corresponding angled portions 32 of the lead screw 20. The major diameter 34 and minor diameter 36 of the threads 18 provide a slight clearance to the threads of the lead screw 20.

FIG. 5 is an end view of the nut 10 showing that there are three inner threaded segments 14 independently movable in a radial direction and biased toward the central axis by the springs 16. Each of the inner threaded segments 14 is attached to the shell 12 by two webs 40 that extend axially the entire length of the segments 14. The webs 40 have cross sections that are significantly less in area than that of the segments 14, so that radial-forces on the segments causes the webs 40 to bend, thus allowing the segments to move radially relative to the shell 12. The inner threaded segments 14 are isolated from the tubular portion 22 of the shell 12 by a circumferential relief 48, as shown in FIG. 2, so that the only attachment between the segments and the shell are the webs 40. The segments 14 are thus spring biased into intimate contact with the lead screw 20 to minimize or eliminate backlash, yet have some radial compliance to accommodate wear, radial run-out in the lead screw, and tolerances in the threads that would otherwise affect the contact between the lead screw and the nut 10.

The segments 14 are rigidly coupled to the shell 12 by virtue of the webs 40, so that axial forces on the segments causes little or no axial movement of the segments relative to the shell. Three pockets 42 are formed between the radially-outer surfaces 44 of the segments 14, the two webs 40, and the radially-inner surfaces 46 of the shell 12.

The springs 16 are located in the pockets 42 and exert a radially inward force to the radially-outer surfaces 44 of the segments 14, thereby forcing the segments into contact with the lead screw. The springs 16 are preferably fabricated from flat pieces of stainless steel, about 0.005 to 0.006 inch thickness, bent into shape. The springs 16 have a central portion 50 that contacts the radially-outer surfaces 44 of the segments 14 and two outer portions 52 that are bent to an angle relative to the central portion and that contact the radially-inner surfaces 46 of the shell 12. The precise shape of the springs 16 depends upon the amount of force to be applied by the springs. More force can be applied by bending the outer portions 52 to a steeper angle relative to the central portion 50 (or by using a thicker material), causing more deflection of the spring when installed and, consequently, more force applied to the segment.

The body of the nut 10 is preferably fabricated from a monolithic block of material, i.e., is a one piece structure. Preferably, the body of the nut 10 is composed of a low-friction, self-lubricating material such as DSM Delrin AF Blend or Turcite. The machining of the segments proceeds from the inside out, so that the inner threads 18 are machined before the segments 14 are cut and the pockets 42 and webs 40 are formed. Alternatively, the nut 10 may be fabricated as a multiple piece structure.

As an alternative to a monolithic construction, it may be desirable to make the tubular portion 22 of the nut 10 from one material and the lead-screw-contacting segments 14 from a different material. That way the beneficial characteristics of a low-friction, self-lubricating material can be used for contacting the lead screw and a stiffer, low-thermal-expansion material, such as stainless steel or ceramic, can be used to attach the threaded portion of the nut to the mounting plate 26.

From the above description, it will be apparent that the invention disclosed herein provides a novel and advantageous anti-backlash nut assembly. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. An anti-backlash nut comprising:
   a body having an axially-extending bore, an outer shell, and three inner segments, wherein each of the three inner segments has internal thread for engaging a portion of the circumference of a lead screw that is inserted into the bore, and wherein the three inner segments are integrally formed as a monolithic structure with the outer shell to permit only radial movement of the inner segments perpendicular to the axis of rotation of the lead screw; and
   springs disposed in pockets between the outer shell and the three inner segments for biasing the three inner segments radially inward to force the internal threads of the inner segments against the lead screw.

2. An anti-backlash nut as recited in claim 1 wherein each inner segment is attached to the outer shell with two axially-extending webs that permit radial movement of the inner segment.

3. An anti-backlash nut as recited in claim 2 wherein said pocket is defined between a radially-outer surface of an inner segment, its two corresponding webs, and a radially-inner surface of the outer shell, and wherein one of the springs is mounted in each pocket.

4. An anti-backlash nut as recited in claim 2 wherein the body and its outer shell, inner segments, and webs are a monolithic structure.

5. An anti-backlash nut as recited in claim 1 wherein each spring has a portion contacting a radially-outer surface of one of the inner segments and a portion contacting a radially-inner surface of the shell.

6. An anti-backlash nut as recited in claim 1 wherein each spring has a central portion contacting a radially-outer surface of one of the inner segments and two outer portions contacting a radially-inner surface of the shell.

7. An anti-backlash nut as recited in claim 1 wherein each of the springs is fabricated from a flat piece of metal.

8. An anti-backlash nut as recited in claim 1 wherein the internal threads of the inner segments have helical surfaces that contact complementary helical surfaces of the lead screw.

9. An anti-backlash nut as recited in claim 1 wherein the body is composed of a low-friction material.

10. An anti-backlash nut as recited in claim 1 wherein the body is composed of a self-lubricating material.

11. An anti-backlash nut as recited in claim 1 wherein the body is composed of DSM Delrin AF Blend.

12. An anti-backlash nut as recited in claim 1 further comprising means for engaging the body to provide a mounting for the anti-backlash nut.

13. An anti-backlash nut comprising:

a body having an axially-extending bore, an outer shell, and three inner segments, wherein each of the three inner segments has internal thread-engaging portions for engaging a portion of the circumference of a lead screw;

wherein each inner segment is attached to the outer shell with two axially-extending webs that permit radial movement of the inner segment, wherein a pocket is defined between an inner segment, its two webs, and the outer shell; and three springs each mounted in a pocket and each biasing a corresponding inner segment radially inward.

* * * * *